US007072759B2

(12) United States Patent
Dolker

(10) Patent No.: US 7,072,759 B2
(45) Date of Patent: Jul. 4, 2006

(54) METHOD FOR CONTROLLING AN INTERNAL COMBUSTION ENGINE GENERATOR UNIT

(75) Inventor: Armin Dolker, Immenstaad (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 10/533,510

(22) PCT Filed: Nov. 8, 2003

(86) PCT No.: PCT/EP03/12480

§ 371 (c)(1),
(2), (4) Date: May 2, 2005

(87) PCT Pub. No.: WO2004/044408

PCT Pub. Date: May 27, 2004

(65) Prior Publication Data

US 2005/0279324 A1 Dec. 22, 2005

(30) Foreign Application Priority Data

Nov. 12, 2002 (DE) ................................ 102 52 399

(51) Int. Cl.

| | |
|---|---|
| ***F02D 41/14*** | (2006.01) |
| ***F02D 41/06*** | (2006.01) |
| ***G06F 19/00*** | (2006.01) |
| *F02D 31/00* | (2006.01) |
| *F02D 41/34* | (2006.01) |

(52) U.S. Cl. ................. 701/104; 701/110; 123/339.19; 123/352

(58) Field of Classification Search ........... 123/339.11, 123/339.14, 339.19, 179.16, 179.17, 350, 123/352, 347, 358, 436, 478, 480, 491; 701/104, 701/105, 110, 111, 115; 290/30 R, 30 A, 290/30 B, 40 R, 40 A, 40 C See application file for complete search history.

(56) References Cited

U.S. PATENT DOCUMENTS

| | | | | |
|---|---|---|---|---|
| 4,520,778 | A * | 6/1985 | Nanjo et al. | 123/352 |
| 4,800,857 | A * | 1/1989 | Tomisawa | 123/674 |
| 4,821,698 | A | 4/1989 | Atago et al. | 123/436 |
| 4,926,334 | A * | 5/1990 | Suzuki et al. | 123/352 |
| 6,441,506 | B1 * | 8/2002 | Nakashima | 290/40 C |
| 6,470,851 | B1 * | 10/2002 | DeGroot et al. | 123/352 |
| 2004/0181353 | A1 | 9/2004 | Doelker | 702/96 |
| 2005/0253394 | A1 * | 11/2005 | Dolker et al. | 290/30 A |

FOREIGN PATENT DOCUMENTS

| | | | | | |
|---|---|---|---|---|---|
| DE | 101 22 517 | C1 | | 6/2002 | |
| EP | 1 219 807 | A2 | | 7/2002 | |
| JP | 59229020 | A | * | 12/1984 | 123/352 |
| JP | 01187339 | A | * | 7/1989 | 123/352 |
| JP | 11062685 | A | * | 3/1999 | 123/352 |

* cited by examiner

*Primary Examiner*—Willis R. Wolfe, Jr.
(74) *Attorney, Agent, or Firm*—Wolff & Samson PC; Klaus P. Stoffel

(57) ABSTRACT

An actual run-up ramp is measured for internal combustion engine-generator unit during a starting process. The actual run-ramp is then set as the set run-up ramp. In this way, the closed-loop control of the internal combustion engine-generator unit adapts itself to the on-site conditions.

7 Claims, 5 Drawing Sheets

METHOD FOR CONTROLLING AN INTERNAL COMBUSTION ENGINE GENERATOR UNIT

Priority Claim

This is a 35 U.S.C. §371 National Stage of International Application No. PCT/EP2003/012480, filed on Nov. 8, 2003. Priority is claimed on that application and on the following application:

Country: Germany, Application No. 102 52 399.1, Filed: Nov. 12, 2002.

BACKGROUND OF THE INVENTION

The invention concerns a method for the closed-loop control of an internal combustion engine-generator unit.

An internal combustion engine provided as a generator drive is usually delivered by the manufacturer to the end customer without the coupling and generator. The coupling and generator are installed at the end customer's facility. To guarantee a constant rated frequency for the current supply into the power supply system, the internal combustion engine is operated in a closed-loop speed control system. In this regard, the speed of the crankshaft is detected as a controlled value and compared with a set speed, i.e., the reference input. The resulting control deviation is converted by a speed controller to a correcting variable for the internal combustion engine, for example, a set injection quantity.

Since certain data on the coupling characteristics and the moment of inertia of the generator are often unavailable to the manufacturer before the delivery of the internal combustion engine, the electronic control unit is often delivered with a robust set of controller parameters, the so-called standard set of parameters.

A speed run-up ramp or a run-up ramping rate is stored in this standard set of parameters for the starting process. To allow the fastest possible run-up, this parameter is set to a large value, e.g., 550 revolutions/(minute×second). The previously described closed-loop speed control system and a speed run-up ramp are known, for example, from DE 101 22 517 C1 of the present applicant.

In the case of a generator with a large moment of inertia, a large deviation can develop between the set run-up ramp and the actual run-up ramp. This control deviation of the actual speed from the set speed causes a significant increase in the set injection quantity. In a diesel engine with a common-rail injection system, the significant increase in the set injection quantity promotes the formation of black smoke. The significant increase in the set injection quantity also causes incorrect computation of the injection start and the set rail pressure, since both of these values are computed from the set injection quantity.

For the manufacturer of the internal combustion engine, the problems described above mean that for an internal combustion engine-generator unit with a large moment of inertia, an on-site service technician must adapt the control parameters of the standard set of parameters to the specific conditions. This is time-consuming and expensive.

SUMMARY OF THE INVENTION

The goal of the invention is to reduce the adaptation expense for the starting process of an internal combustion engine-generator unit.

The invention provides that an actual run-up ramp is determined from the actual speed of the internal combustion engine, and the set run-up ramp is set to this actual run-up ramp.

A self-adaptive system, which adapts itself to the specific on-site conditions, is mapped by means of this adaptation of the set run-up ramp. This makes further adaptations of the standard set of parameters unnecessary. A significant change in the set injection quantity is likewise suppressed in this way. Therefore, the set injection quantity reaches the steady-state preset value faster. The consequence for the run-up is that the computed injection start and the set rail pressure are in better agreement with the values determined under steady-state conditions, i.e., certain values are involved. These steady-state values are determined by the manufacturer on the test stand and are stored in the standard set of parameters.

To compute the actual run-up ramp, the speed change in the actual speed is observed within an assigned time interval. The actual run-up ramp can then be computed, for example, by taking the mean value.

To improve the operational reliability, appropriate limiting values are provided for the adaptation. Consequently, the adaptation of the set run-up ramp occurs only when it is within the limiting values.

BRIEF DESCRIPTION OF THE DRAWINGS

The drawings show a preferred embodiment of the invention.

DETAILED DESCRIPTION OF THE INVENTION

Figure 1:
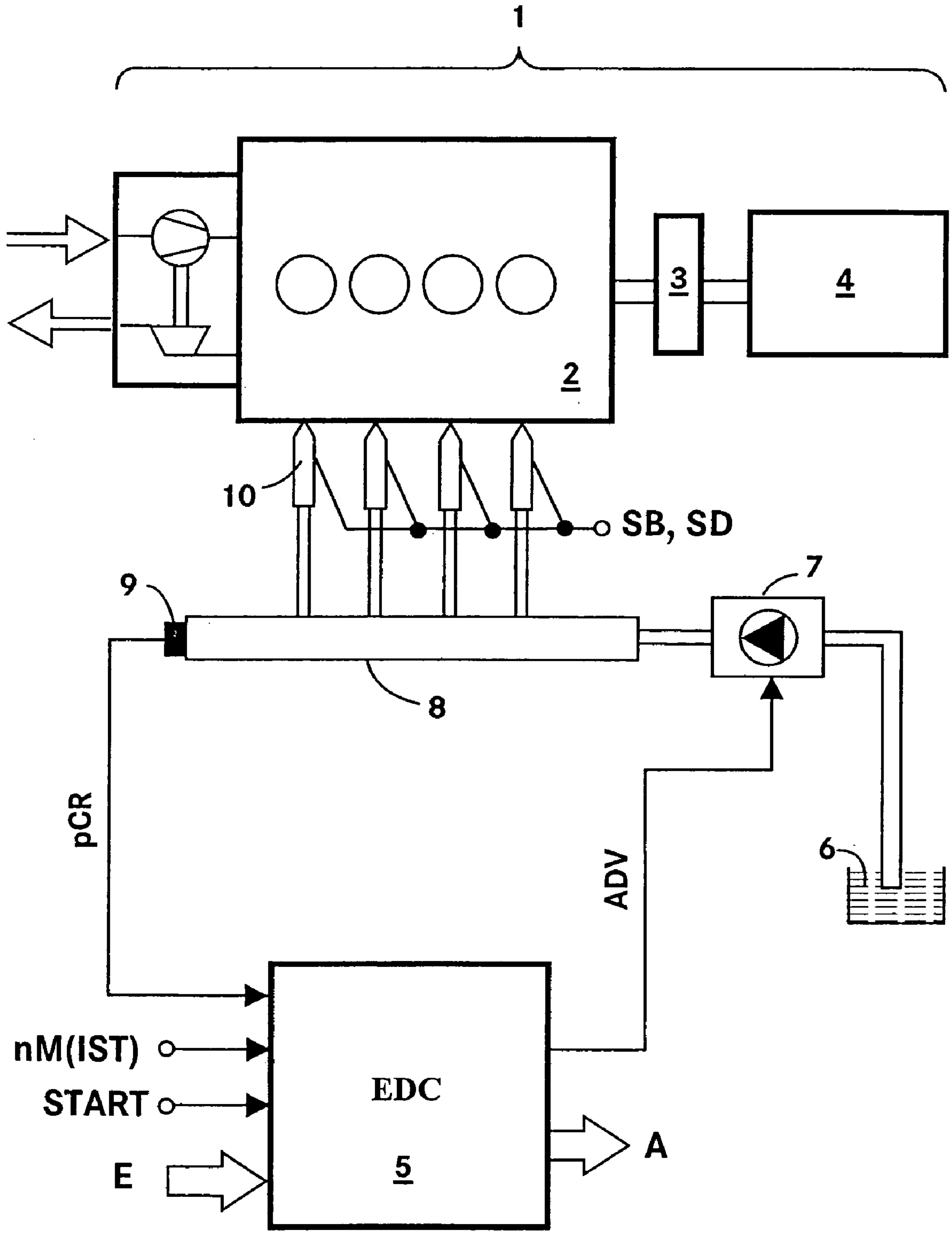
FIG. 1 shows a system diagram.

FIG. 1 shows a system diagram of the overall system of an internal combustion engine-generator unit 1, which consists of an internal combustion engine 2 with a generator 4. The internal combustion engine 2 drives the generator 4 via a shaft with a transmission element 3. In practice, the transmission element 3 can comprise a coupling. In the illustrated internal combustion engine 2, the fuel is injected by a common-rail injection system. This injection system comprises the following components: pumps 7 with a suction throttle for conveying the fuel from a fuel tank 6; a rail 8 for storing the fuel; and injectors 10 for injecting the fuel from the rail 8 into the combustion chambers of the internal combustion engine 2.

The operation of the internal combustion engine 2 is automatically controlled by an electronic control unit (EDC) 5. The electronic control unit 5 contains the usual components of a microcomputer system, for example, a microprocessor, interface adapters, buffers, and memory components (EEPROM, RAM). The relevant operating characteristics for the operation of the internal combustion engine 2 are applied in the memory components in input-output maps/characteristic curves. The electronic control unit 5 uses these to compute the output variables from the input variables. FIG. 1 shows the following input variables as examples: a rail pressure pCR, which is measured by means of a rail pressure sensor 9; an actual speed signal nM(IST) of the internal combustion engine 2; an input variable E; and a signal START for the start set-point assignment. The start input assignment is activated by the operator. Examples of input variables E are the charge air pressure of a turbocharger and the temperatures of the coolant/lubricant and the fuel.

As output variables of the electronic control unit 5, FIG. 1 shows a signal ADV for controlling the pumps 7 with a suction throttle and an output variable A. The set rail pressure pCR(SW) is determined by means of the signal ADV. The output variable A is representative of the other control signals for automatically controlling the internal combustion engine 2, for example, the injection start SB and the injection time SD.

Figure 2:
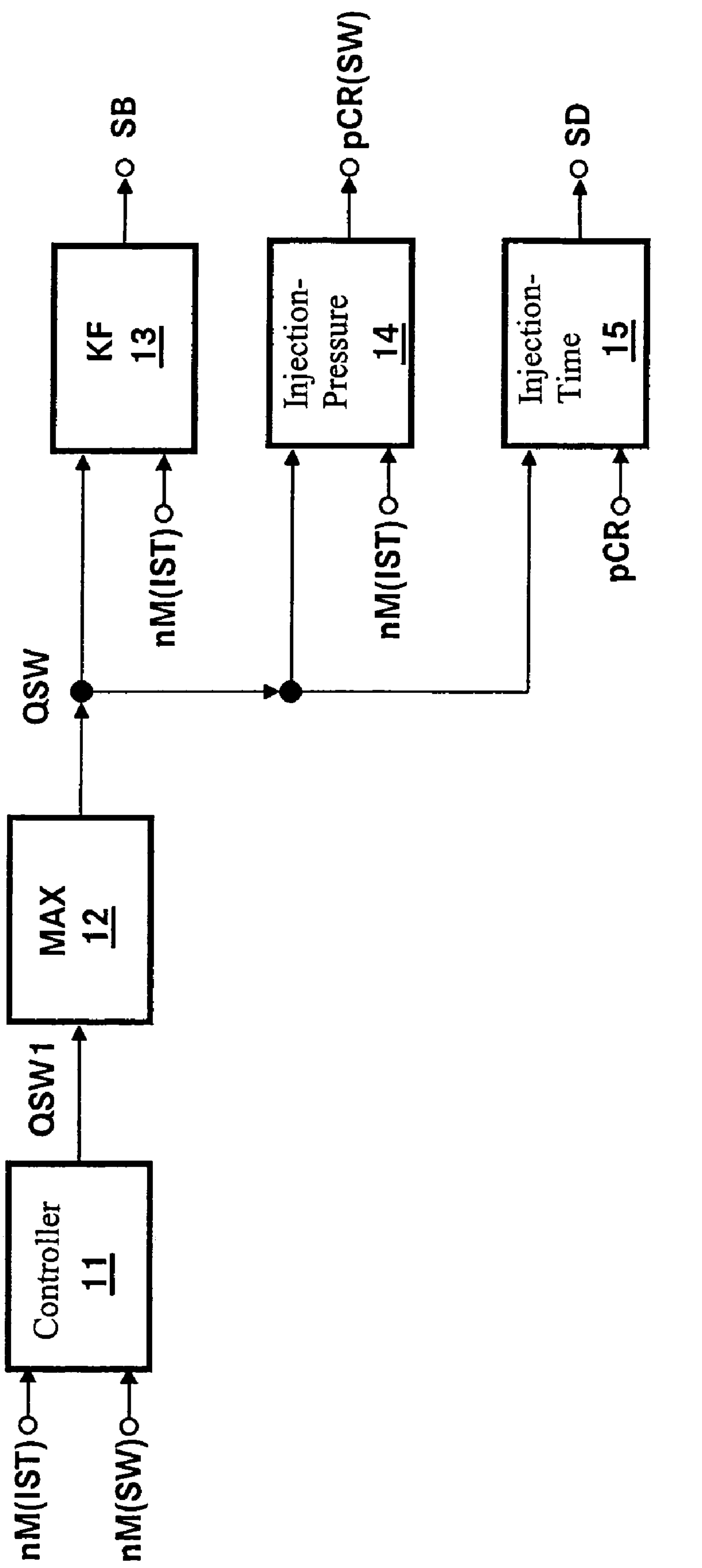
FIG. 2 shows a functional block diagram.

FIG. 2 shows a functional block diagram for computing the injection start SB, the set rail pressure pCR(SW), and the injection time SD. A speed controller 11 computes a set injection quantity QSW1 from the actual speed nM(IST) of the internal combustion engine and the set speed nM(SW). This computed value is limited to a maximum value by a limiter 12. The output quantity, which corresponds to the set injection quantity QSW, is the input variable of the input-output maps 13 to 15. The injection start SB is computed as a function of the set injection quantity QSW and the actual speed nM(IST) by the input-output map 13. The set rail pressure pCR(SW) is computed as a function of the set injection quantity QSW and the actual speed nM(IST) by the input-output map 14. The injection time SD is determined as a function of the set injection quantity QSW and the rail pressure pCR by the input-output map 15.

It is apparent from the functional block diagram that a large control deviation leads to a significant increase in the set injection quantity QSW1. This significant increase is limited to a maximum value by the limiter 12. This maximum value of the set injection quantity in turn causes a false injection start SB and a false set rail pressure, i.e., the injection pressure, to be computed.

Figure 3A:
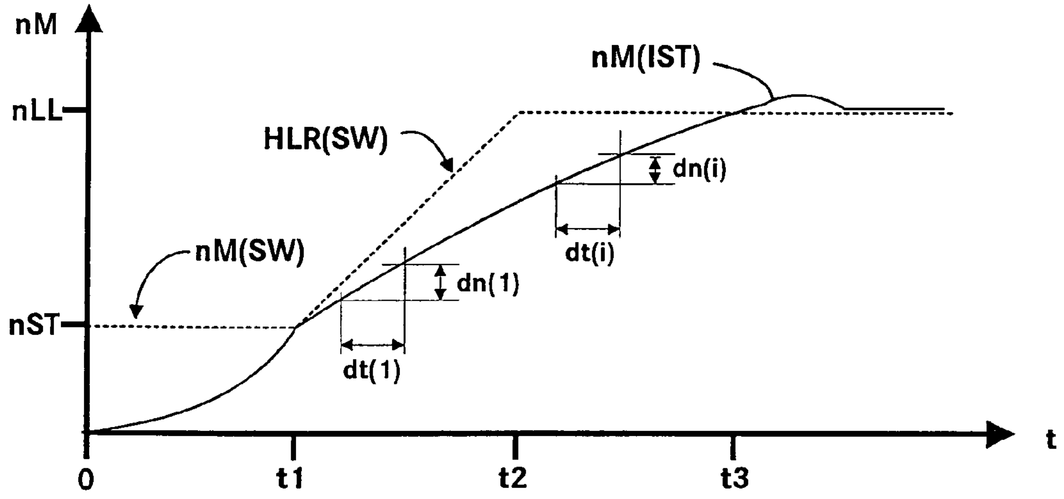
FIGS. 3A, B, C show a time diagram of a starting process.
Figure 3B:
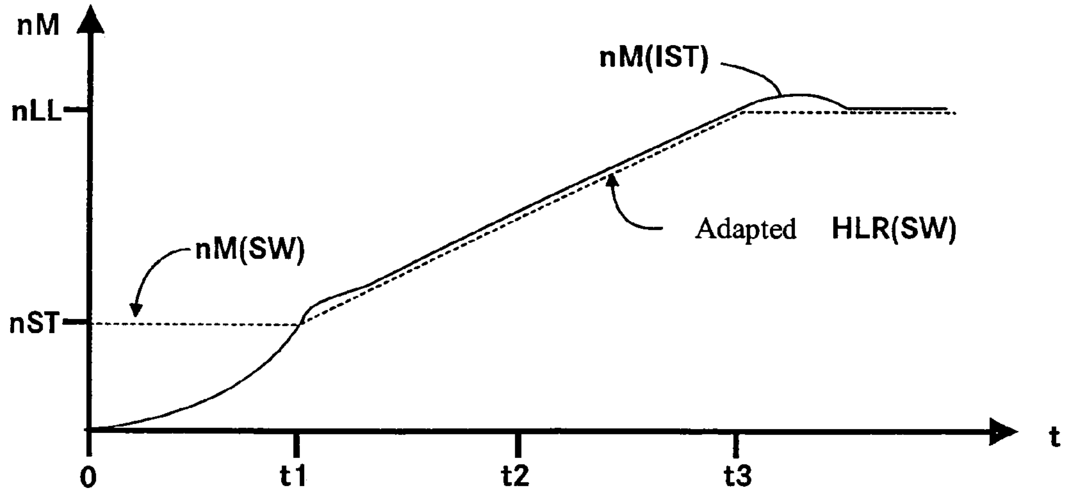
Figure 3C:
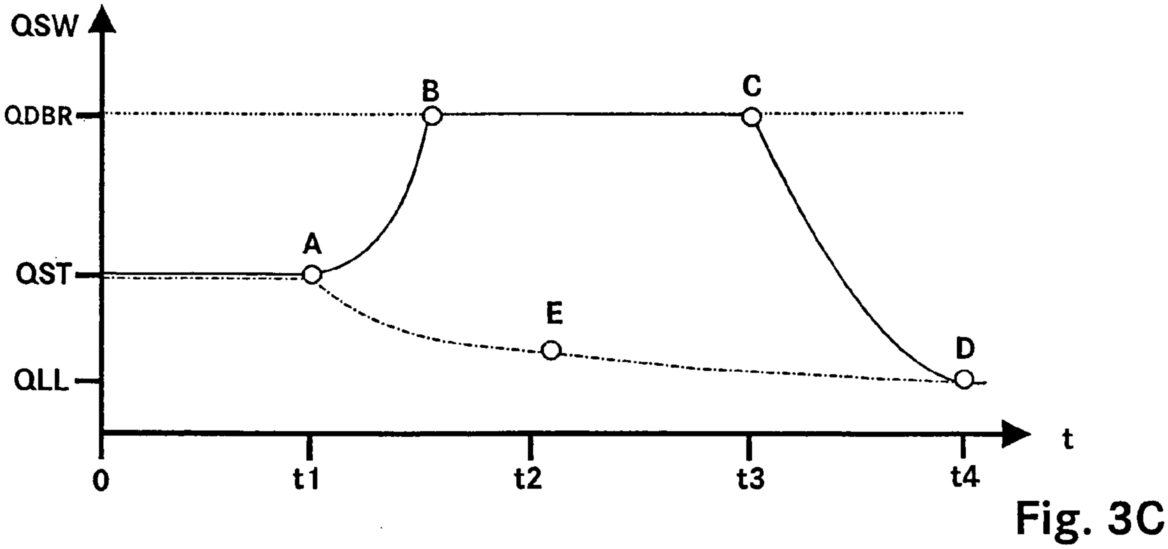

FIG. 3 has three parts 3A to 3C, which show, in each case, as a function of time: the behavior of the set speed and the actual speed in the initial state (FIG. 3A); the behavior of the set speed and actual speed after the adaptation (FIG. 3B); and the behavior of the set injection quantity QSW (FIG. 3C). In FIG. 3C, the set injection curve with the solid line, which is the curve containing the points A to D, corresponds to the initial state. The dot-dash line, which is the curve containing the points A, E, and D, corresponds to the curve after the adaptation.

First, the process sequence in the initial state will be explained. In the initial state, the internal combustion engine-generator unit 1 is operated according to the standard set of parameters. The discussion which follows is based on a generator with a large moment of inertia. At time zero, the start is initiated. The set speed nM(SW) is set at a first value nST, for example, 650 rpm. A set injection quantity QSW, value QST, is preset by the speed controller. The actual speed nM(IST) approaches the set speed nM(SW) until time t1 (see FIG. 3A). From time t1 to time t2, a set run-up ramp HLR(SW) is preset by the electronic control unit. A typical value for the rate of increase of the set run-up ramp is 550 revolutions/(minute×second). Due to the large moment of inertia of the generator, the actual speed nM(IST) does not follow the set run-up ramp HLR(SW). This control deviation is used by the speed controller to compute a higher set injection quantity QSW, i.e., the curve of the set injection quantity QSW in FIG. 3 varies from point A towards point B. The increasing control deviation causes a significant increase in the set injection quantity QSW. This set injection quantity is set at a maximum value by a limiter. In FIG. 3, this limitation is represented as a dot-dash line that runs parallel to the x-axis. The maximum value is denoted here as QDBR. Accordingly, the set injection quantity QSW is limited to the value QDBR at point B.

At time t3, the actual speed nM(IST) reaches an idling speed, for example, 1,500 rpm. This speed value is denoted in FIG. 3A as nLL. The actual speed nM(IST) subsequently overshoots the idling speed nLL and finally settles back to this level. Since a control deviation of practically zero is now present, the speed controller computes a steady-state value of the set injection quantity. This is represented in FIG. 3C by the value QLL. Consequently, in the interval t3 to t4, the set injection quantity QSW falls from the limiting value of point C to the steady-state value of point D.

The invention now provides that the actual run-up ramp HLR(IST) is determined from the actual speed nM(IST). For this purpose, the speed changes of the actual speed nM(IST) are observed within an assigned time interval. In FIG. 3A, two pairs of values are shown as examples. A first pair of values consists of the time interval dt(1) and the change in speed dn(1). The second pair of values consists of the time interval dt(i) and the change in speed dn(i). The actual run-up ramp can be computed from these pairs of values, for example, by taking the mean values:

$$HLR(IST)=\mathrm{SUM}(dn(i))/\mathrm{SUM}(dt(i))$$

where

HLR(IST)=actual run-up ramp

SUM=sum in the observed interval (i=1 to i=n)

dn(i)=change in speed dt(i)=time interval

After the actual run-up ramp HLR(IST) has been computed, the set run-up ramp HLR(SW) is set to the values of the actual run-up ramp HLR(IST).

FIG. 3B shows the adapted set run-up ramp HLR(SW) of FIG. 3A. It is apparent that the set run-up ramp was adapted in such a way that the set speed nM(SW) and the actual speed nM(IST) are almost identical during the time interval t1 to t3. For the computation of the set injection quantity QSW, this means that, starting at time t1, the set injection quantity QSW is guided to the steady-state value, here QLL, along the dot-dash line, i.e., along the curve that contains the points A, E, and D.

After adaptation of the set run-up ramp HLR(SW), a smaller set injection quantity QSW is thus obtained during the engine start, which results in the avoidance of black smoke formation. At the same time, the input-output maps in FIG. 2 are computed with a smaller set injection quantity [[QDW]] QSW. This leads to more favorable operating values. This improves the accelerating power of the engine. Due to this improvement, in practice, the set run-up ramp HLR(SW) can be set by a greater run-up ramp HLR(JST) than that determined from the actual speed behavior. Consequently, the following applies:

$$HLR(SW)=(\mathrm{SUM}(dn(i))/\mathrm{SUM}(dt(i))+K)$$

where

HLR(SW)=set run-up ramp

SUM=sum in the observed interval (i=1 to i=n)

dn(i)=change in speed dt(i)=time interval

K=constant (K>0)

Figure 4:
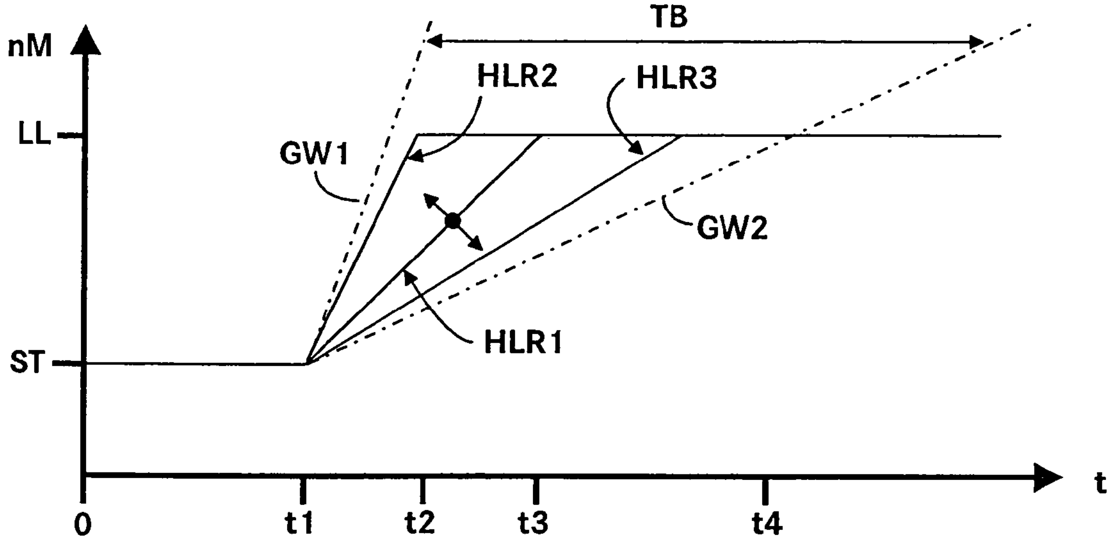
FIG. 4 shows a characteristic curve.

FIG. 4 shows a characteristic curve. It shows several set run-up ramps as a function of time. HLR1 denotes the set run-up ramp in the initial state, as it is mapped in the standard set of parameters when the internal combustion engine is delivered. In accordance with the invention, the set run-up ramp HLR1 is adapted as a function of the actual run-up ramp computed from the actual speed nM(IST). In FIG. 4, two additional run-up ramps HLR2 and HLR3 are plotted as examples. The set run-up ramp HLR3 will occur in an internal combustion engine-generator unit with a large moment of inertia. The set run-up ramp HLR2 will occur in an internal combustion engine-generator unit with a very small moment of inertia. In addition, a first limiting value GW1 and a second limiting value GW2 for error protection are plotted. Consequently, the adaptation of the set run-up ramp occurs only when the new set run-up ramp lies within a tolerance band TB, which is defined by the first limiting value GW1 and the second limiting value GW2.

Figure 5:
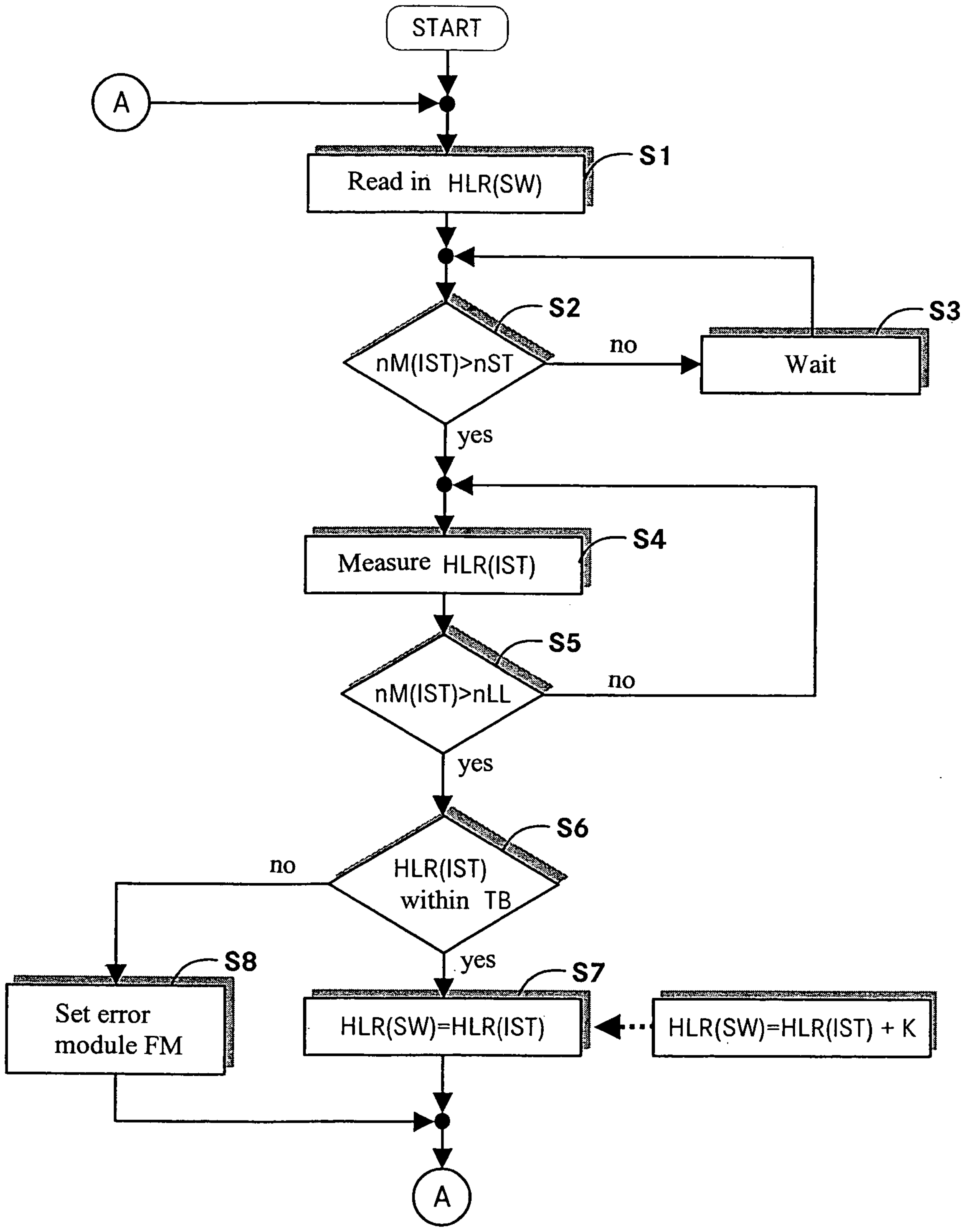
FIG. 5 shows a program flowchart.

FIG. 5 shows a program flowchart. At S1, the set run-up ramp HLR(SW) is read in. At S2, a check is then made to determine whether the actual speed nM(IST) is greater than the start speed nST, for example, 650 rpm. If this is not the case, the program flows to a wait loop at S3. If the interrogation at S2 is positive, the actual run-up ramp HLR(IST) is determined at S4 from the behavior of the actual speed nM(IST). At S5, a check is then made to determine whether the actual speed nM(IST) has reached an idling speed nLL, for example, 1,500 rpm. If the idling speed nLL has not yet been reached, the program flowchart returns to step S4.

If the actual speed nM(IST) has reached the idling speed nLL, a check is made at S6 to determine whether the determined actual run-up ramp HLR(IST) is within the tolerance band TB. If this is the case, then at S7 the set run-up ramp HLR(SW) is set to the values of the actual run-up ramp HLR(IST). Alternatively, provision can be made to set the set run-up ramp HLR(SW) to the sum of the actual run-up ramp HLR(IST) and a constant. The program then jumps to program point A.

If the measured actual run-up ramp HLR(IST) is outside the tolerance band TB, then at S8 an error mode FM is set, and the program jumps to program point A.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A method for closed-loop speed control of an internal combustion engine-generator unit during a starting process, comprising the steps of: presetting a set speed (nM(SW)) by means of a set run-up ramp (HLR(SW)); computing a control deviation from the set speed (nM(SW)) and an actual speed (nM(IST)); determining a set injection quantity (QSW) for controlling the actual speed (nM(IST)) from the control deviation by means of a speed controller; and, determining an actual run-up ramp (HLR(IST)) from the actual speed (nM(IST)), ((HLR(IST))=f(nM(IST))), and setting this as the set run-up ramp (HLR(SW)).

2. The method for closed-loop speed control in accordance with claim 1, including setting the actual run-up ramp (HLR(IST)) as the set run-up ramp (HLR(SW)) at least when an idling speed (nLL) has been reached.

3. The method for closed-loop speed control in accordance with claim 1, further including checking to determine whether the actual run-up ramp (HLR(IST)) is within a tolerance band (TB).

4. The method for closed-loop speed control in accordance with claim 3, including setting an error mode (FM) if the actual run-up ramp (HLR(IST)) is outside the tolerance band (TB).

5. The method for closed-loop speed control in accordance with claim 1, including determining the actual run-up ramp (HLR(IST)) from a change in speed (dn(i), i=1, . . . , n) of the actual speed (nM(IST)) within an assigned time interval (dt(i)).

6. The method for closed-loop speed control in accordance with claim 5, including computing the actual run-up ramp (HLR(IST)) from the change in speed (dn(i)) during the time interval (dt(i)) by taking the mean value.

7. The method for closed-loop speed control in accordance with claim 6, wherein the actual run-up ramp (HLR (IST)) and a constant (K) are added (HLR(SW)=HLR(IST)+K).

* * * * *